(12) United States Patent  
Burch

(10) Patent No.: US 7,415,336 B1
(45) Date of Patent: Aug. 19, 2008

(54) METHODS, DEVICES, AND SYSTEMS FOR AUTOMATIC FLIGHT LOGS

(75) Inventor: Matthew C. Burch, Lawrence, KS (US)

(73) Assignee: Garmin Ltd. (KY)

( * ) Notice: Subject to any disclaimer, the term of this patent is extended or adjusted under 35 U.S.C. 154(b) by 276 days.

(21) Appl. No.: 10/979,908

(22) Filed: Nov. 2, 2004

Related U.S. Application Data

(60) Continuation of application No. 10/848,712, filed on May 19, 2004, now Pat. No. 6,868,320, which is a division of application No. 10/327,829, filed on Dec. 23, 2002.

(51) Int. Cl.
*G01C 21/00* (2006.01)
*G06F 19/00* (2006.01)
(52) U.S. Cl. ............... 701/35; 701/33; 701/120; 701/213; 340/995.27; 340/994
(58) Field of Classification Search ............ 701/35, 701/213, 33, 120, 15, 16, 200, 211; 340/995.27, 340/994, 951, 995, 971, 438; 244/76 R
See application file for complete search history.

(56) References Cited

U.S. PATENT DOCUMENTS

| | | | |
|---|---|---|---|
| 4,421,981 A | 12/1983 | Hough | 250/253 |
| 4,692,869 A | 9/1987 | King et al. | 701/206 |
| 4,827,419 A | 5/1989 | Selby, III | 701/200 |
| 4,831,538 A | 5/1989 | Cucchiari et al. | 701/200 |
| 4,862,374 A | 8/1989 | Ziemann | 701/200 |
| 5,526,265 A | 6/1996 | Nakhla | 701/16 |
| 5,550,738 A * | 8/1996 | Bailey et al. | 455/456.5 |
| 5,758,297 A | 5/1998 | Gaultier | 701/14 |
| 5,919,239 A | 7/1999 | Fraker et al. | 701/35 |
| 6,112,141 A | 8/2000 | Briffe et al. | 701/14 |
| 6,181,990 B1 | 1/2001 | Grabowsky et al. | 701/14 |
| 6,278,913 B1 | 8/2001 | Jiang | 701/3 |
| 6,405,107 B1 | 6/2002 | Derman | 701/3 |
| 6,408,232 B1 * | 6/2002 | Cannon et al. | 701/29 |
| 6,424,893 B1 * | 7/2002 | Byrne et al. | 701/35 |
| 6,493,610 B1 * | 12/2002 | Ezaki | 701/3 |
| 6,522,958 B1 | 2/2003 | Dwyer et al. | 701/3 |
| 6,526,341 B1 | 2/2003 | Bird et al. | 701/35 |
| 6,633,801 B1 | 10/2003 | Durlacher et al. | 701/9 |
| 6,701,234 B1 * | 3/2004 | Vogelsang | 701/35 |
| 2002/0035416 A1 | 3/2002 | DeLeon | 701/14 |

* cited by examiner

*Primary Examiner*—Tan Q Nguyen
(74) *Attorney, Agent, or Firm*—Kevin E. West; Samuel M. Korte

(57) ABSTRACT

Systems, devices, and methods are provided for automatic flight logs. One method includes receiving one or more location data points associated with a flight, automatically recording the one or more location data points in a flight log, and allowing access through a display user-interface to view and operate on the flight log. Receiving the one or more location data points includes obtaining the location data points from a global positioning system (GPS).

19 Claims, 5 Drawing Sheets

METHODS, DEVICES, AND SYSTEMS FOR AUTOMATIC FLIGHT LOGS

RELATED APPLICATIONS

The present application is a continuation of an earlier-filed U.S. patent application Ser. No. 10/848,712, filed May 19, 2004, U.S. Pat. No. 6,868,320, which is a divisional and claims priority benefit of an earlier-filed U.S. patent application Ser. No. 10/327,829, filed Dec. 23, 2002. Thus, the present application claims priority benefit of, and incorporates by specific reference, both of the above-identified applications.

FIELD OF THE INVENTION

The present invention relates generally to aviation systems, methods, and devices and, more particularly, to global positioning system (GPS) based avionic devices and methods for automatically logging flight.

BACKGROUND OF THE INVENTION

In the field of general aviation, pilots must regularly maintain flight log books which record departure and arrival locations and flying time for their flights. Such flight log books serve as evidence of a pilot's experience level and are necessary to obtain and maintain different certification levels.

In the past, flight log books were physically maintained as paper logs. For the general aviation enthusiast, this meant added amount of time and paperwork in connection with every flight made. This approach to flight log books further relies on the pilot's memory and diligence for completeness.

In recent years, many personal computer (PC) software products have been developed which are intended as a replacement for the paper logbook. Unfortunately, however, all of these software products require manual entry of flight records.

DETAILED DESCRIPTION

In the following detailed description of the invention, reference is made to the accompanying drawings which form a part hereof, and in which is shown, by way of illustration, specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense, and the scope of the present invention is defined only by the appended claims, along with the full scope of equivalents to which such claims are entitled.

Figures 1A, 1B:
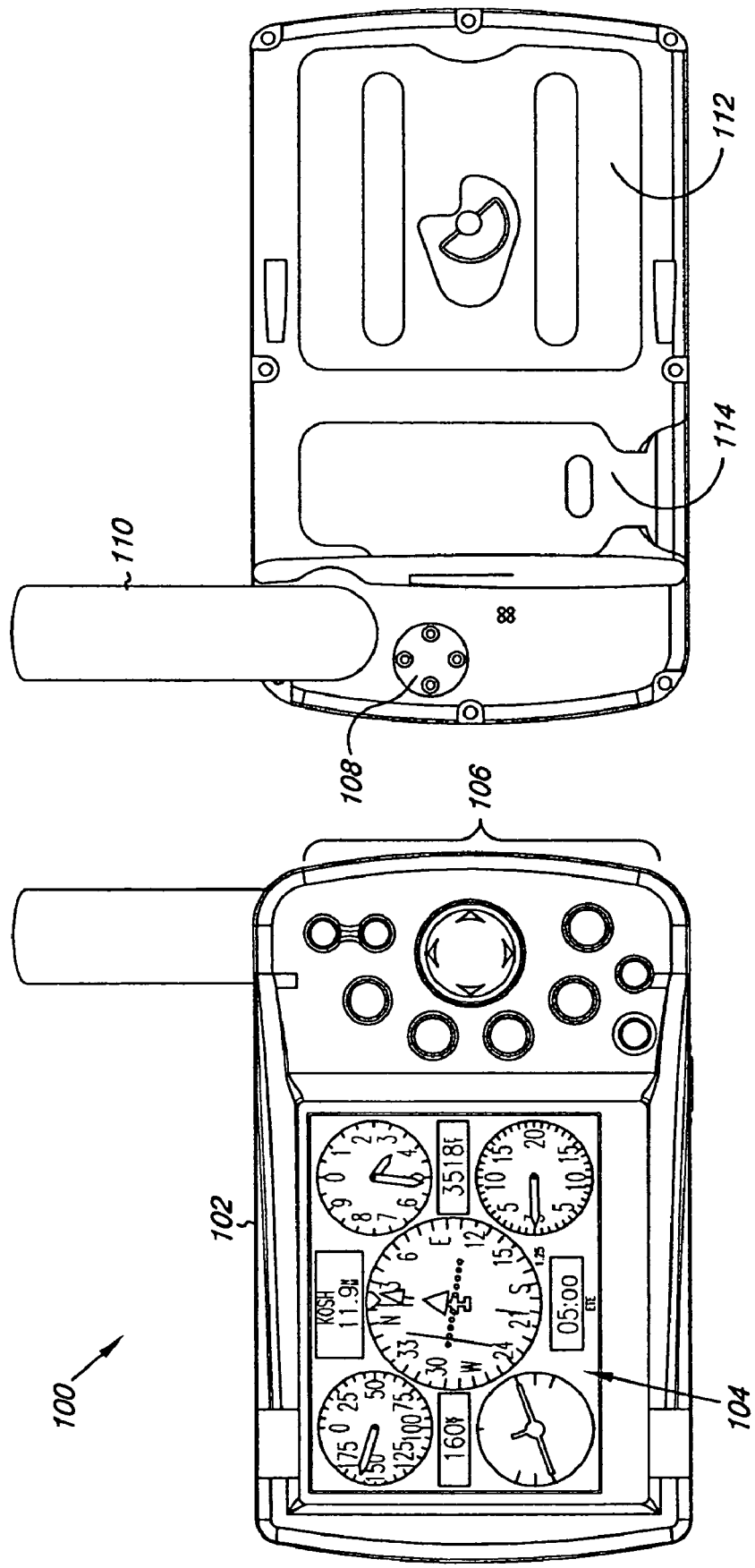
FIG. 1A illustrates a front view of an embodiment of an avionics device according to the teachings of the present invention.
FIG. 1B illustrates a rear view of the avionics device embodiment shown in FIG. 1A.

FIG. 1A illustrates a front view for an embodiment of an electronic device 100 according to an embodiment of the present invention. As one of ordinary skill in the art will appreciate upon reading this disclosure, the electronic device 100 of FIG. 1A includes an avionics device 100. However, as one or ordinary skill in the art will appreciate upon reading and understanding this disclosure, in the various embodiments of the present invention, the electronic device 100 also includes a land and/or automotive device, as well as a marine device 100.

As shown in the embodiment of FIG. 1A, the electronic device 100, or avionics device 100, includes, but is not limited to, a rugged, protective housing 102 suitable to protect the device's internal electronics in an air, land, or water environment. In the various embodiments, the protective housing 102 includes a fully gasketed, high-impact, plastic alloy, waterproof case. This is but one example, and other protective housings 102 are considered within the scope of the present invention. As shown in FIG. 1A, the electronic device 100 includes a display 104. In some embodiments, the display 104 includes a 3.8 inch diagonal, 12-level grayscale, 320×240 pixels, ¼ VGA display. The invention, however, is not so limited. In other embodiments, the display 104 includes a color display. One example of the electronic device 100 includes the GPSMAP 196 as manufactured by Garmin International, Inc. of Olathe, Kans.

The display 104 is operable to present a number of different screen displays. The number of different screen displays include, but are not limited to, a split-screen moving map and a horizontal situation indicator (HSI) display, a GPS panel page, a runway extension page, on-screen pop-up windows, an automatic log book, map detail, marine map screen, a flight plan, and automotive turn-by-turn directions. In the embodiment shown in FIG. 1A, the display 104 illustrates an HSI display as the same are known and understood by those of ordinary skill in the avionics arts. As will be explained in more detail below, in the various embodiments of the present invention, the electronic device 100 includes a built-in basemap operable to show lakes, rivers, cities, highways, and state boundaries on the display 104.

As further shown in FIG. 1A, the electronic device 100 includes a number of input devices 106 such as data entry keys, function keys, softkeys, and the like. The input devices 106 shown in FIG. 1 include a rocker pad design for easy, one-hand operation.

FIG. 1B is a rear view for an embodiment of the electronic device 100. As shown in FIG. 1B, the electronic device 100 includes a data port 108 operable to upload and download data between the electronic device 100 and another electronic device, such as by using a USB connector or other suitable connection. In some embodiments, as will be discussed below, data can be uploaded and downloaded to the electronic device 100 using a transceiver in the device 100 which can accommodate a wireless transmission medium such as infrared, Bluetooth, and/or Radio Frequency (RF) signals. The invention is not so limited. In the various embodiments of the present invention and as will be explained further herein, the data port is operable to upload and download Jeppesen data, device/unit 100 software, and flight logbook data. As shown in the embodiment of FIG. 1B, the electronic device 100 includes an adjustable, removable antenna 110, such as a GPS antenna 110.

In the embodiment of FIG. 1B, the electronic device includes a battery port 112 for housing batteries such as "AA" batteries and the like. The invention, however, is not so limited and one of ordinary skill in the art will appreciate that an external power supply port is considered within the scope of the present invention. Likewise, the various embodiments of the invention can include an electronic device having a data card slot, or data card port 114. As one of ordinary skill in the art will appreciate, the electronic device 100 can further include a mounting bracket (not shown) so that the electronic device 100 can be selectably and removably mounted on surface.

As one of ordinary skill in the art will appreciate, the illustrations shown in FIGS. 1A and 1B are but one example of a hardware configuration for an electronic device. Other configurations are considered within the scope of the present invention.

Figure 2:
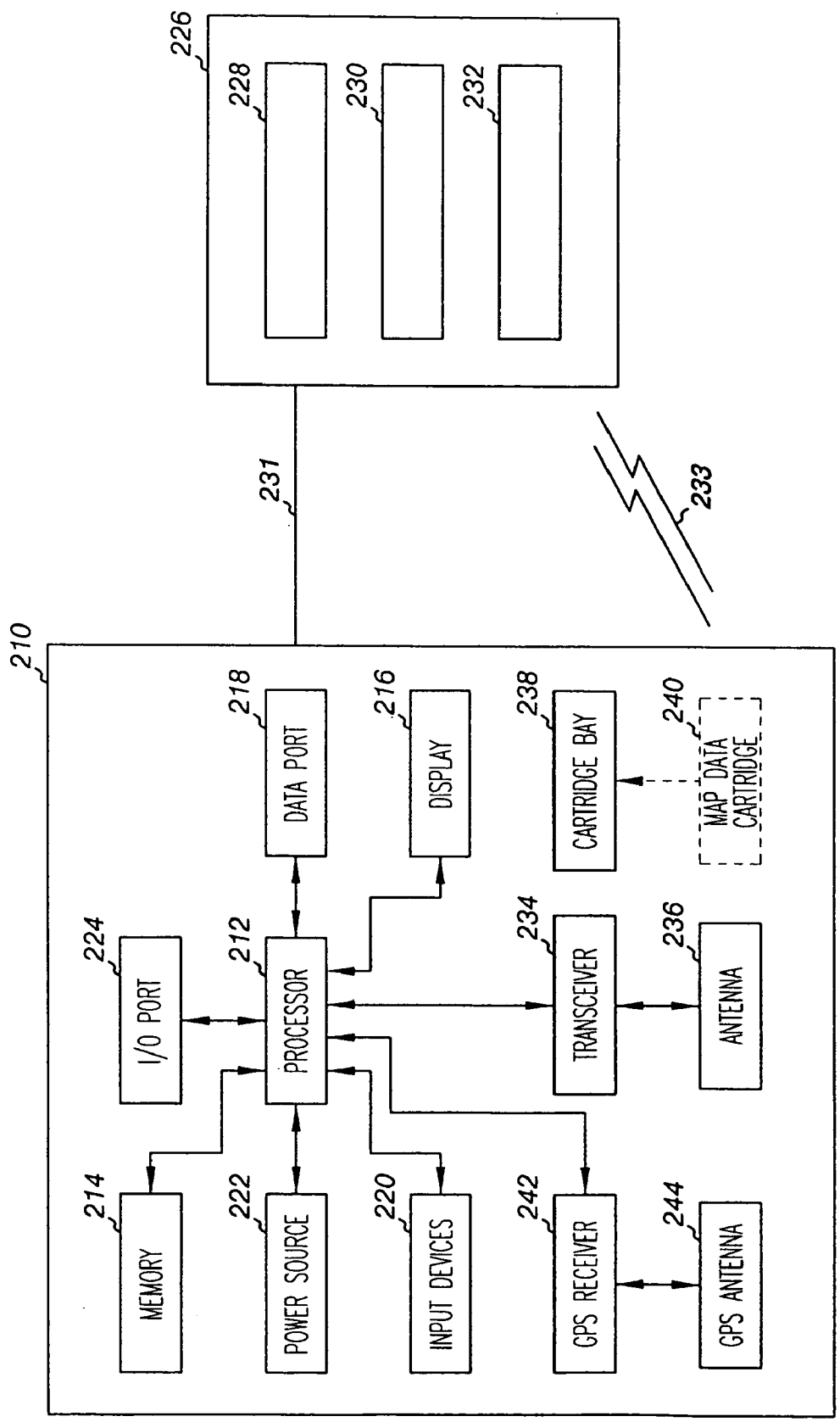
FIG. 2 is a block diagram of one embodiment of the electronic components associated with the present invention.

FIG. 2 is a block diagram of one embodiment for the electronic components associated with the present invention. The electronic components are discussed in connection with an avionics device 210 as the same have been described herein. The invention, however, is not so limited. As shown in FIG. 2, an avionics device 210 associated with the present invention can include a processor 212, a memory 214, a display 216, one or more data ports 218, input devices 220, and one or more I/O ports 224. As shown in FIG. 2, and as one of ordinary skill in the art will appreciate, the above components can operably communicate with one another. In particular, the memory 214 can include computer executable instructions which can be operated on to provide the aspects of the present invention.

Additionally, as shown in the embodiment of FIG. 2, the data port 218 is operable to upload and download data between the electronic device 210 and another electronic device 226, such as a laptop computer, personal digital assistant (PDA), testing apparatus, cell phone, other intelligent appliance, or the like. As shown in the embodiment of FIG. 2, such other electronic device 226 can include a processor 228, a memory 230 and a display 232. In some embodiments, the avionics device 210 uploads and downloads data to and from another electronic device 226 using a USB connection or other suitable connection to the data port. In the embodiment of FIG. 2, a hardwire data link is illustrated as 231.

In other various embodiments of the present invention, data can be uploaded and downloaded between the avionics device 210 and another electronic device 226 using a transceiver 234 and antenna 236 for sending and receiving data in a wireless fashion. In the embodiment of FIG. 2, a wireless data and/or communication link is illustrated as 233. As such, the avionics device 210 can accommodate a wireless transmission medium such as infrared, Bluetooth, and/or Radio Frequency (RF) signals. Examples of the data uploaded and downloaded to the avionics device 210 includes, but is not limited to, Jeppesen data, device/unit 210 software, and flight logbook data.

As shown in FIG. 2, the various embodiments of the avionics device 210 include a data card slot, or data card port, cartridge bay or other receptacle of the like 238 for receiving a data cartridge 240. The cartridge bay 238 and data cartridge 240 allow the device 210 to utilize data stored on an external cartridge 240. As one of ordinary skill in the art will appreciate upon reading this disclosure, external data cartridge 240 can be used to transfer a wide range of data, including but not limited to cartographic data, avionics navigation data, automotive navigation data, marine craft navigation data, waypoints, and points of interest, to the memory 214 of the avionics device 210. As shown in the embodiment of FIG. 2, the avionics device 210 further includes a global positioning (GPS) receiver 242 operably coupled to the processor 212 and a GPS antenna 244. The GPS receiver 242 and antenna 244 enable the avionics device 210 to resolve its location, as the same will be known and understood by one of ordinary skill in the art. In some embodiments, the avionics device 210 is wide area augmentation system (WAAS) capable which allows for even more precise location resolution.

According to various embodiments of the present invention, an electronic device as described in connection with FIGS. 1A, 1B, and 2 includes at least three distinct modes of operation. In the various embodiments, the at least three distinct modes of operation include an aviation mode, a land mode and a water mode. In these embodiments, a first mode of operation includes an avionics mode. In one embodiment of the avionics mode, four main pages are linked together in series. By way of example, and not by way of limitation, the four main pages include a map page, a HSI page, an active route page, and a position page. In the avionics mode, airports and navigational aids (navaid) are selectable. That is, the input keys described above can be used to enter an identifier, facility name, or city, and the rocker pad can be used to select a highlighted character or move to a next character field. Also, input keys can be used to retrieve detailed information for a destination waypoint or a next waypoint in a route (waypoints are known and understood by one of ordinary skill in the navigation arts to be any geographic point in a route including the staring points, any number of intermediate points, and ending points. As one of ordinary skill in the art will understand, waypoints can be user selectable.). The input keys can also be used for retrieving navaid frequencies or airport information such as communication frequencies, runway information, field elevation, or available fuels. In various embodiments, the input keys enable scrolling through available frequencies on a communications file tab. Likewise, when viewing information on "runway" or "approach" file tabs, runway designation or approach names can be highlighted and then scrolled through to select available runways/approaches. As one of ordinary skill in the art will appreciate upon reading this disclosure, a number of avionics navaids are operable in complementary fashion to the flight logbook aspects of the present invention.

In the embodiments of the present invention, a second mode of operation includes a land mode. In one embodiment of the land mode, four main pages are linked together in series. This sequence of pages is slightly different from the four main pages presented in the above embodiment of the avionics mode. By way of example, and not by way of limitation, the four main pages in a land mode include a map page, a Radio Magnetic Indicator (RMI) page, a current route page, and a position page. In the embodiments of the present invention, a third mode of operation includes a water mode. The sequence of main pages in a water mode can also vary from the sequences described above. One of ordinary skill in the art of navigation will understand upon reading the present disclosure that many different page configurations are considered within the scope of the present invention.

In the land or water modes, input keys can be used to search for predefined or user created waypoints such as, cities, highway exits, boat launches, tide stations, and the like. In various embodiments, software is operable on the device to search for points of interest, street addresses, street intersection (crossroads), and the like. Such information can be viewable in two formats, e.g. by "name" (a list of every item available for a category) or by "nearest" (a list of only those items for a category that are nearby). Using the GPS capabilities of the device, the "nearest" list updates continuously.

In the avionics mode, the input keys can similarly be used. That is, in a nearest format, the nearest airports can be displayed. This is useful for many reasons, e.g. when an airspace alert is issued. Additional information for waypoints such as, airports, navaids, and user-created waypoints are available from a set of waypoint information pages. In the various embodiments, these can be accessed by using the "nearest" format and selecting from one or more file tabs. Selecting a desired waypoint will provide a page showing additional waypoint information.

Using the GPS capabilities of the device, a map page will graphically depict the device's position. In avionics mode, this will graphically depict position relative to nearby airports, navaids, airspace boundaries, lakes, rivers, coastlines, cities, and highways. The device's present position is indicated by an aircraft symbol (in aviation mode) or a pointer symbol (in land or water mode). In the various embodiments, a planned route appears on a cartographic or map presentation as a bold line. A track log (which shows where the device has been) appears as a series of small points. In the various embodiments, the map display has a number of range scales, e.g. 20 feet to 800 miles (5 meters to 1200 kilometers). The map scale can be controlled by the input keys.

FIGS. 3A-3H, illustrate a number of display screen embodiments which are operable with the flight logging aspects of the present invention. That is, the software of the present invention is operable to present data and provide various user interfaces on a display as well as record, or log, such data into a real time flight log book.

Figure 3A:
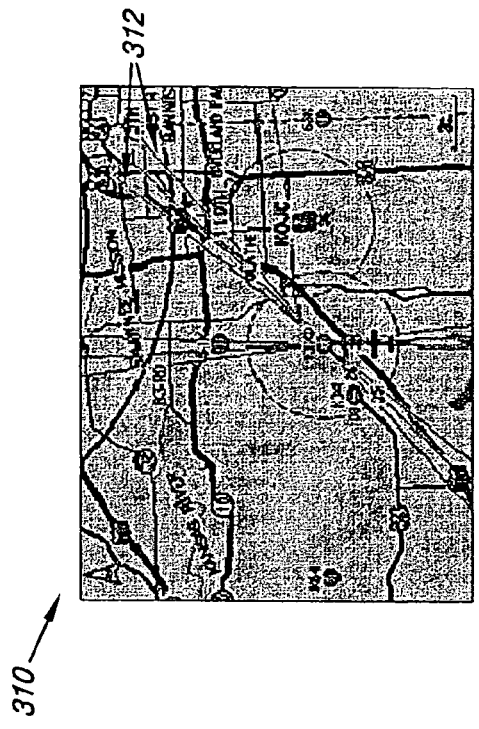
FIGS. 3A-3H, illustrate a number of display screen embodiments which are operable with the flight logging aspects of the present invention.

In the display example of FIG. 3A, a GPS panel page 300 is presented. In various embodiments, such a GPS panel page can be selected to appear in the avionics mode main page sequence, e.g. in place of an HSI page. As shown in the GPS panel page 300, an HSI 301 is shown along with altitude 302, attitude, rate of turn 303, airspeed 306, and heading information 307. The HSI works much like a mechanical HSI, indicating a desired course 307 and any deviation left/right of the course. For example, if the aircraft needle 307 points straight up and the course deviation needle 304 is centered, an aircraft housing the device is heading directly to the intended destination. If the course deviation needle 304 is left or right of the desired course, the aircraft should be steered toward the needle. In the screenshot of FIG. 3A, waypoint indicator, in the geometric shape of a triangle 305, appears at the center of the HSI 301 to indicate waypoint passage. As one of ordinary skill in the art will appreciate, this data can be recorded using the software of the present invention.

Figure 3B:
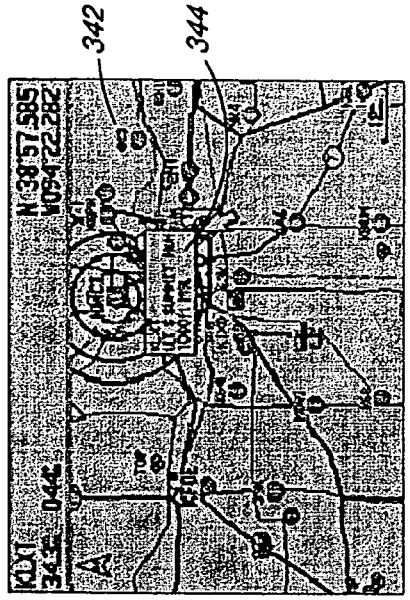

FIG. 3B illustrates a screen display embodiment 310 for runway extensions according to the teachings of the present invention. The extended runway centerlines 312 shown in FIG. 3B help to orient a user of the device to a runway.

Figure 3C:
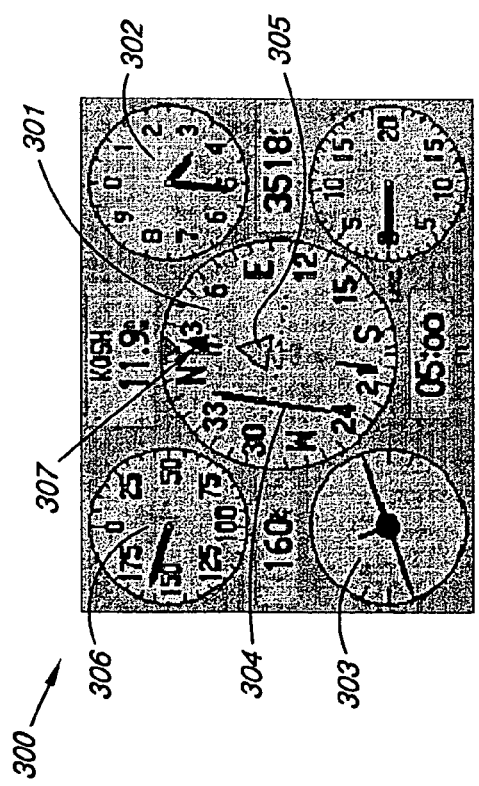

FIG. 3C illustrates a split screen display embodiment 320 of the present invention. The split screen display embodiment of FIG. 3C illustrates a first, or left side, display portion 322 and a second, or right side, display portion 324. In the embodiment of FIG. 3C, the left side display portion 322 is illustrating a cartographic map display with a top-down view from above an aircraft housing the device. The runway extensions 326 are also shown in the cartographic illustration of this embodiment. On the right side display portion is shown flight data, including an HSI, an enroute time estimation (ETE) to the next waypoint (ETE NEXT) 328, an ETE to a destination (ETE DEST) 330, a distance to next waypoint 332, an indication of airspeed data 334. In this embodiment, the next waypoint is the destination and thus the data displayed for the ETE NEXT is identical to the ETE DEST data.

Figure 3D:
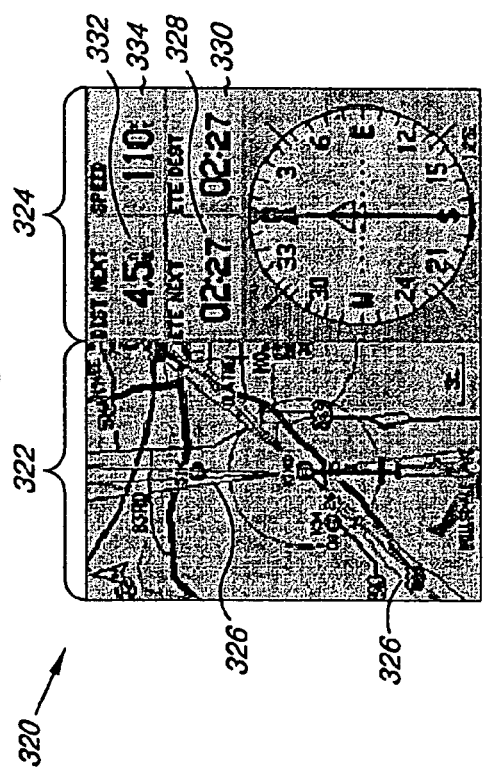

FIG. 3D illustrates a cartographic, or map page, screen display embodiment 340 according to the teachings of the present invention. The main display portion includes cartographic data 342 which includes, but is not limited to, airport locations, highways, cities, and the like. The embodiment of screen display 3D illustrates an on-screen pop-up window 344 capability of the present invention. Using input keys, an arrow can be brought across selected waypoints or locations. When this occurs, additional data for that particular waypoint is provided as a pop-up window 344.

Figure 3E:
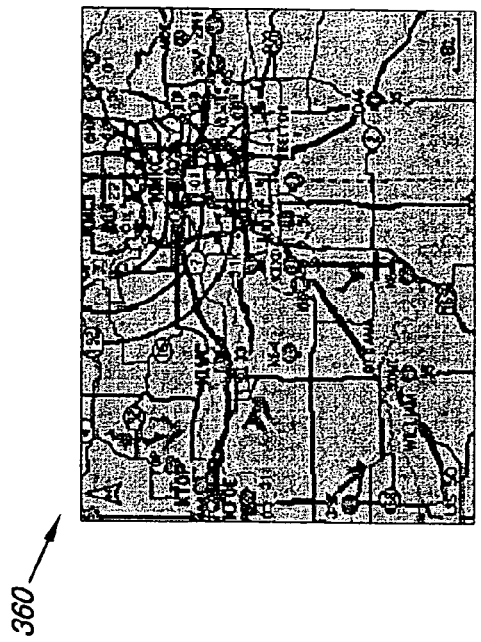

FIG. 3E illustrates an automatic flight log book screen display embodiment 350 according to the teachings of the present invention. As shown in the embodiment of FIG. 3E, a number of "main menu" file tabs 352 are provided along the left hand column of the screen. In FIG. 3E, these tabs 352 can include GPS, Route, Flights, Points, Trip, Track, Setup, Map, E6B, Celes, and Tide categories, just to name a few. The invention, however, is not limited to this specific list or configuration. In the various embodiments of the present invention, a main menu page provides access to various waypoint, system, navigation, interface, and setup menus in an easy to use "tab" format. The main menu page is available from any page using the input keys. Selected tabs can be further divided into groups, or sub-tabs by function.

In the various embodiments, selecting the GPS tab shows satellite status, time/date, accuracy, Dilution of Precision (DOP), and differential information. In various embodiments, selecting the GPS tabs can provide on/off selectability of a wide area augmentation system (WAAS) feature. Menu options include enable and disable, built-in simulator, and select location. Selecting the flights tab shows recorded flight information, including date, route of flight, and flight time. A detail window for each listed flight also indicates flight distance. Selecting the route tab displays any saved routes and allows a user to create, edit, activate, or delete routes. In various embodiments, selecting the points tab allows a user to create, edit, or delete user waypoints and provides proximity alarm waypoints. In various embodiments, selecting a track tab shows a status of track memory, recording criteria, and a list of saved tracks. On-screen buttons are provided to clear or save the active track log. Selecting a trip tab can provide trip computer functions such as average speed, maximum speed, odometers, and timers. Menu options allow the trip computer to be reset individually or collectively. In various embodiments, selecting an aircraft tab provides multiple aircraft profile settings that are used for flight planning/trip planning features. Weight and balance computer functions are also provided. In various embodiments, selecting the E6B tab allows a user to calculate density altitude, true airspeed, and winds aloft. In various embodiments, selecting the Celes tab shows sun/moon time cycles/positions, best times and good times for hunting or fishing, and 24 hour tide charts (with tide levels and times). In various embodiments, selecting a map tab provides settings for the map page features. And, in various embodiments, selecting a set-up tab (not shown in FIG. 3E) displays the settings for system functions, vertical navigation (VNAV), airspace alarms, general alarms, road routing, timers, time format/zone, units of measure, location format and interface.

In the embodiment of FIG. 3E, the flights file tab 354 is shown highlighted. Accordingly, a main portion of the screen display 356 provides a flight track log, organized with column headings, Date, Route of Flight, and Hours. As one of ordinary skill in the art will understand upon reading this disclosure, the software of the present invention is operable to record all of an aircraft's flight data over the course of time and to automatically maintain an electronic flight log book. In the various embodiments, the software is operable to associate a latitude and longitude coordinate (lat/lon location), derived from GPS, with a waypoint, e.g. airport or otherwise, and is operable to provide a descriptor associated with that lat/lon location to the display. As one of ordinary skill in the art will understand upon reading this disclosure, such descriptors can be preprogrammed or use definable. For example, in the embodiment of FIG. 3E the Route of Flight information provides descriptors for starting and ending locations of a flight e.g. KMWL-KIXD.

As shown in the embodiment of FIG. 3E, a pop-up window 358 provides detailed data associated with a particular flight when one of the flights in the flight log is highlighted. Thus in FIG. 3E, a selected, or highlighted, flight route, e.g. KIXD (starting airport) to KSBN (ending airport), pops-up including detailed data associated with that flight. In some embodiments, the software associates a nearest waypoint with an actual geographic (lat/lon location) as a starting point and/or an ending point. As shown in the embodiment of FIG. 3E, the detailed data in the pop-up display can include, but is not limited to, the date of the flight, an aircraft identifier, e.g. N430G, the distance of the flight, and the length or duration of flight time. In the various embodiments, software is operable to associate the aircraft identifier with a make and model number of an aircraft as well as other information associated with the aircraft, e.g. weight and balance information, fuel capacity information, and the like. In the various embodiments, the length or duration of flight time can also present what portion of the flight time was at night. That is, in various embodiments, the device also includes software which can resolve sunrise and sunset times for a current location. In various embodiments, the software resolves the sunset and sunrise times by utilizing GPS information and one or more algorithms for determining a time of day, e.g. sunset/sunrise times, relative to a particular position/location on the Earth. In various embodiments, this can be performed in conjunction with a database containing sunrise and sunset times for either specific locations, regions, or the like. In the various embodiments, the software is operable to satisfy and incorporate FAA requirements, namely, that night time flight is only logged during the period starting one hour after official sunset and ending one hour before official sunrise. That is, the software can record or log night time flight according to the guidelines promulgated by the FAA.

A selectable option is also presented to accept the data and include the same as part of a flight log. Likewise, a selectable option is available to delete, edit, or otherwise modify one or more selected flights in the flight log.

Figure 3F:
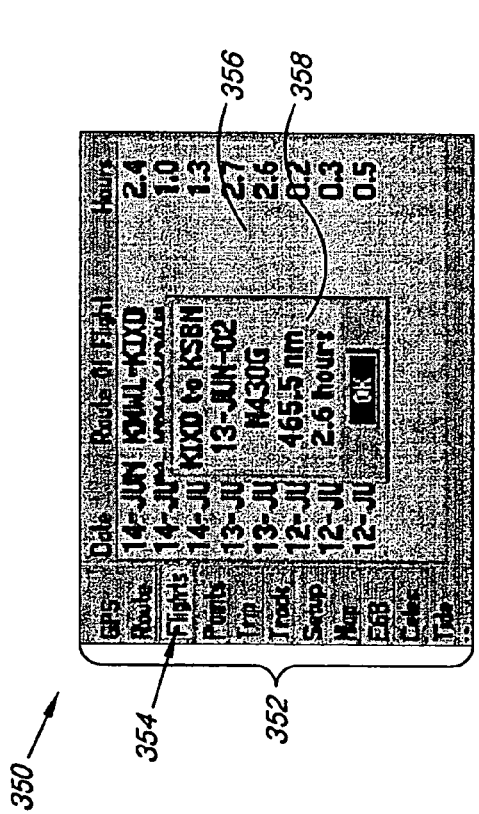

FIG. 3F illustrates another map detail screen display embodiment 360 according to the teachings of the present invention. In the various embodiments, the input keys can be used to zoom in or zoom out so as to change the scale of the map displayed, the area displayed, and the level of detail displayed. Input keys can also be used to pan right, left, up, or down to view areas of map detail which are outside of or away from a present position. As shown in the embodiment of FIG. 3F, cartographic map detail is shown from a top-down view above a plane housing the device. The invention, however, is not so limited.

Figure 3H:
Figure 3G:
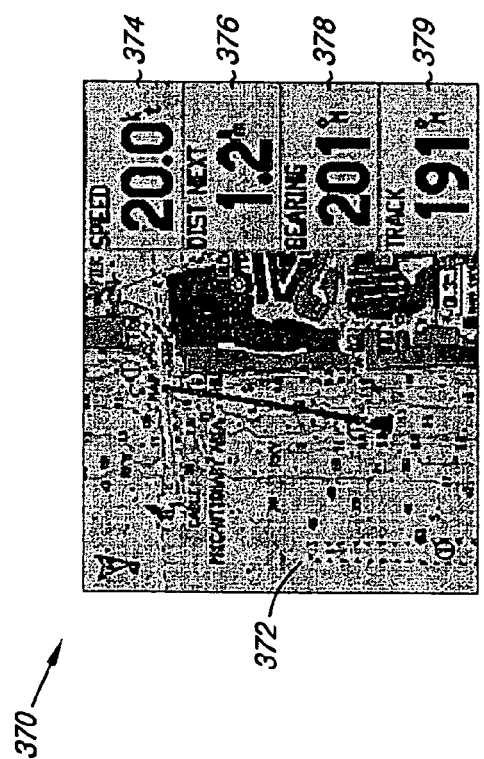

FIG. 3G illustrates a marine map screen display embodiment 370 according to the teachings of the present invention. As shown in the embodiment of FIG. 3G a marine chart 372 is provided on the display. In FIG. 3G, a speed 374, distance to the next waypoint 376, bearing 378, and track 379 are also provided.

FIG. 3H illustrates an automotive turn-by-turn directions screen display embodiment 380 according to the teachings of the present invention. As shown in the embodiment of FIG. 3H, an ordered sequence of instructions is presented for navigating to a selected destination.

Embodiments of the present invention include software, application modules, and computer executable instructions operable on the devices and systems described herein. The embodiments, however, are not limited to any particular operating environment. Nor is the software limited to software written in a particular programming language. Thus, the invention includes a set of instructions executable by an information handling system to produce the embodiments described herein. That is, the software can reside on a free standing avionics device as shown in FIG. 1 and/or can, in some embodiments, be loaded, stored, and reside on a cockpit instrument panel.

According to the various embodiments of the present invention, an avionics device, including software operable thereon, can monitor position, speed, and/or altitude (derived from GPS) and the relative positions of the nearest airports and user waypoints (from the internal database) to determine when an aircraft takes off and lands. Using the software of the present invention, a new electronic logbook entry is recorded automatically, and without any user intervention, every time the device takes off and lands. Each flight record can store the date of the flight, the route of the flight including departure and arrival airports/waypoints, and the distance and duration of the flight. Other data such as maximum speed, maximum altitude, and night flight time can also be recorded in various embodiments of the invention. In some embodiments, the present invention further enables a user to periodically connect the device to another electronic device (such as the PC described in connection with FIG. 2) to upload and/or download flight data and logbook records for permanent storage, flight plan retrieval, and the like.

Figure 4:
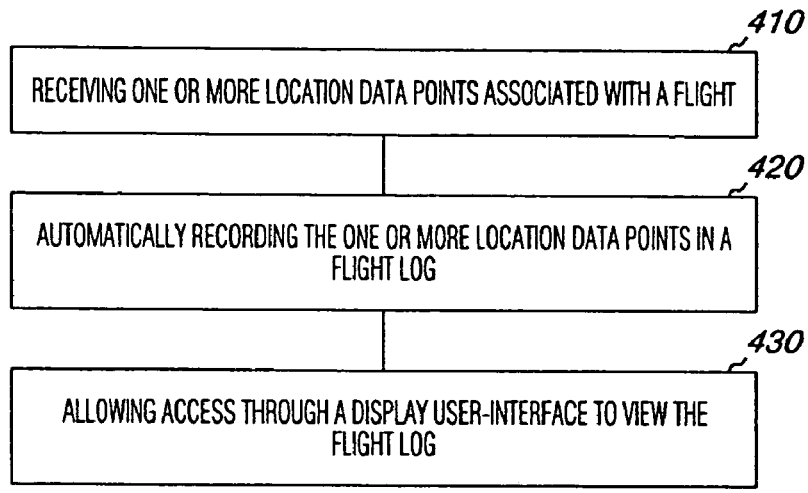
FIGS. 4-6 are flow charts illustrating various method aspects of the invention.
Figure 5:
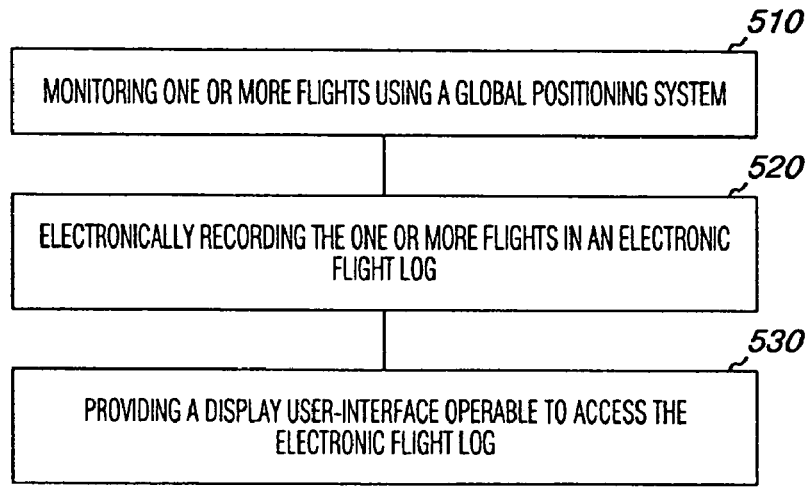
Figure 6:
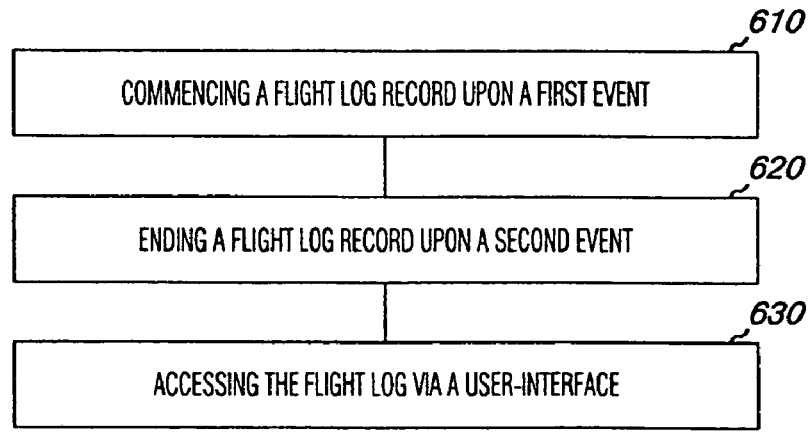

FIGS. 4-6 are flow charts illustrating various method aspects of the invention. As one of ordinary skill in the art will understand, the methods can be performed by software, application modules, and computer executable instructions operable on the systems and devices shown herein or otherwise. The invention, however, is not limited to any particular operating environment or to software written in a particular programming language.

FIG. 4 is a flow chart illustrating one method according to an embodiment of the present invention. It should be understood by those of ordinary skill in the art that one or more of the methods provided herein may be executed in a different order than that described herein. That is, elements of each method claim do not need to be executed in the order shown unless it is stated herein that such order is explicitly required. As shown in FIG. 4, a method for automatically logging flight is provided. The method includes receiving one or more location data points associated with a flight at block 410. In the various embodiments, receiving the one or more location data points includes obtaining the location data points from a global positioning system (GPS). At block 420, the method further includes automatically recording the one or more location data points in a flight log. In the various embodiments, recording the one or more location data points includes recording one or more departure locations for one or more flights and includes recording one or more arrival locations for the one or more flights. The method further includes allowing access through a display user-interface to view the flight log, as shown in block 430.

In the various embodiments, the method further includes recording a date of the flight. In the various embodiments, the method further includes recording a distance and recording a duration of the flight. In the various embodiments, the method further includes recording a time of day for the flight. In the various embodiments, the method further includes recording additional flight data selected from the group of altitude, attitude, maximum speed, and maximum altitude.

FIG. 5 is a flow chart illustrating another method according to an embodiment of the present invention. As shown in FIG. 5, a method for maintaining a flight log is provided. The method includes monitoring one or more flights using a global positioning system (GPS) at block 510. In various embodiments, monitoring one or more flights includes continuously updating a destination airport as a flight progresses. In various embodiments, monitoring one or more flights using a global positioning system includes monitoring the one or more flights using a device capable of receiving wide area augmentation system (WAAS) satellite signals. In various embodiments, monitoring one or more flights includes monitoring an aircraft's speed, altitude, and/or distance of travel and time of travel between two airports while an aircraft is in flight. In various embodiments, at a start of a flight log, monitoring one or more flights includes automatically selecting a departure waypoint/location, derived using GPS, using positional information before an aircraft takes off. And, in various embodiments, at an end to a flight log, monitoring one or more flights includes automatically an arrival selecting waypoint/location using GPS, once an aircraft has landed.

The method further includes electronically recording the one or more flights in an electronic flight log at block 520. In various embodiments, electronically recording includes automatically recording the one or more flights. In various embodiments, electronically recording the one or more flights in an electronic flight log includes commencing recording when a first threshold is reached and ceasing recording when a second threshold is reached.

The method includes providing a display user-interface operable to access the electronic flight log at block 530. Providing a display user-interface operable to access the electronic flight log includes providing a menu driven display with one or more selectable features and function keys as the same have been described in connection with FIGS. 3A-3H, and in particular with FIG. 3E.

FIG. 6 is a flow chart illustrating another method according to an embodiment of the present invention. As before, any of the methods described herein can be performed with a set of computer readable instructions storable on a computer readable medium. As shown in FIG. 6, a method embodiment includes commencing a flight log record upon a first event, as shown in block 610. In various embodiments, commencing a flight log record upon a first event includes automatically commencing the flight log record when an aircraft exceeds a predetermined speed and a predetermined altitude. For example, and not by way of limitation, in various embodiments computer executable instructions are operable on an electronic device to automatically commence recording a flight log when an aircraft's speed exceeds 30 knots and the aircraft gains an altitude of 500 feet. As one of ordinary skill in the art will understand upon reading this disclosure, other selectable parameters for automatically commencing recording are considered within the scope of the present invention.

The method of FIG. 6 further includes ending a flight log record upon a second event, as shown in block 620. In various embodiments, ending a flight log record includes automatically ending the flight log record when an aircraft decelerates to less than a predetermined speed and descends to less than a predetermined altitude. In various embodiments, ending a flight log record upon a second event includes ending the flight log record once an aircraft has touched down and remained landed for more than a set period of time. In various embodiments, computer executable instructions are operable on the electronic device to append one flight log record to another when an aircraft is grounded less than a set period of time between a previous and a next flight log record. Again, as one of ordinary skill in the art will understand upon reading this disclosure, other selectable parameters for automatically ending the flight log record are considered within the scope of the present invention.

As shown in FIG. 6, the method includes accessing the flight log record via a user interface at block 630. In various embodiments, accessing the flight log record via a user interface includes selectably accessing the flight log record from a list of saved flight log records using a display user interface. In these embodiments, selectably accessing the flight log record includes accessing flight log detail including departure and arrival airports, an aircraft identifier, a flight date, a flight distance, a time of day of the flight, and a flight duration.

In various embodiments, the method further includes selectably deleting and/or editing flight log entries. In various embodiments, accessing the flight log record includes downloading a list of flight logs to a non-volatile memory.

CONCLUSION

Methods, devices, and systems for automatic flight logs have been provided. Software operable on GPS based avionics devices allows a user to automatically record and maintain a flight log book as well as to create, manage, analyze, save, and print flight data from an avionics unit with the automatic flight tracking feature. Flight data can automatically contain total time, day and night condition times, cross-country and PIC time, departure and arrival locations (airport name and ID), number of landings, aircraft ID, distance, maximum airspeed, and maximum altitude for each flight. Once recorded, the flight data can be updated, using the software of the present invention, with additional information including number of instrument approaches, actual and simulated instrument time, remarks, etc. Totals for flights can be specified, using the software of the present invention, for all flights, select flights, or flights in the last user-specified number of days. Flight pilot logs created according to the teachings of the present invention can be printed using a "traditional" layout or can be further customized to other layouts using the software to fit a pilot's needs.

Although specific embodiments have been illustrated and described herein, it will be appreciated by those of ordinary skill in the art that any arrangement which is calculated to achieve the same purpose can be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above systems, devices, and methods are used. The scope of the invention should be determined with reference to the appended claims, along with the full scope of equivalents to which such claims are entitled.

What is claimed is:

1. An avionics device, comprising:
   a display;
   a global positioning system (GPS) receiver operable to resolve a location of the device;
   an input device operable to be functioned by a pilot to provide a user input;
   a processor coupled with the display, GPS receiver, and input device, the processor operable to— automatically maintain a flight log book utilizing the location determined by the GPS receiver, control the display to present a visual indication of the flight log book to the pilot, and utilize the user input to modify at least a portion of the flight log book; and a housing to house the display, GPS receiver, input device, and processor.

2. The device of claim 1, further including a memory coupled with the processor and operable to store data corresponding to the flight log book maintained by the processor.

3. The device of claim 2, wherein the processor is operable to utilize the user input to delete a portion of the flight log book stored within the memory.

4. The device of claim 2, wherein the processor is operable to utilize the user input to edit a portion of the flight log book stored within the memory.

5. The device of claim 1, wherein the housing is portable and handheld.

6. The device of claim 1, wherein the processor is further operable to control the display to graphically present flight information.

7. The device of claim 1, wherein the processor and GPS receiver are integral.

8. The device of claim 1, further including a transceiver operable to wirelessly transmit data corresponding to the flight log book to an electronic device external to the housing.

9. The device of claim 1, wherein the processor is operable to commence a flight log record upon a first event and end a flight log record upon a second event.

10. The device of claim 9, wherein commencing the flight log record includes recording a present location in the flight log book as a departure location.

11. The device of claim 9, wherein ending the flight log record includes recording a present location in the flight log book as an arrival location.

12. An avionics device, comprising:
a display;
a memory;
a global positioning system (GPS) receiver operable to resolve a location of the device;
an input device operable to be functioned by a pilot to provide a user input;
a processor coupled with the display, GPS receiver, memory, and input device, the processor operable to—
automatically maintain a flight log book utilizing the location determined by the GPS receiver,
store data corresponding to the flight log book in the memory,
control the display to present a visual indication of the flight log book to the pilot, and
utilize the user input to modify at least a portion of the flight log book and store data corresponding to the modified flight log book in the memory; and
a portable and handheld housing to house the display, GPS receiver, memory, input device, and processor.

13. The device of claim 12, wherein the processor is operable to utilize the user input to delete a portion of the flight log book stored within the memory.

14. The device of claim 12, wherein the processor is operable to utilize the user input to edit a portion of the flight log book stored within the memory.

15. The device of claim 12, wherein the processor is further operable to control the display to graphically present flight information.

16. The device of claim 12, further including a transceiver operable to wirelessly transmit data corresponding to the flight log book to an electronic device external to the housing.

17. The device of claim 12, wherein the processor is operable to commence a flight log record upon a first event and end a flight log record upon a second event.

18. The device of claim 17, wherein commencing the flight log record includes recording a present location in the flight log book as a departure location.

19. The device of claim 17, wherein ending the flight log record includes recording a present location in the flight log book as an arrival location.

* * * * *